United States Patent
Kanahashi

(10) Patent No.: US 7,865,166 B2
(45) Date of Patent: Jan. 4, 2011

(54) SOFTWARE RADIO TRANSCEIVER

(75) Inventor: Yusuke Kanahashi, Hamura (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 545 days.

(21) Appl. No.: 12/029,007

(22) Filed: Feb. 11, 2008

(65) Prior Publication Data
US 2010/0027598 A1     Feb. 4, 2010

(30) Foreign Application Priority Data
Feb. 13, 2007  (JP) ............................. 2007-031542

(51) Int. Cl.
*H04B 1/38* (2006.01)
*H04L 9/00* (2006.01)

(52) U.S. Cl. ...................... 455/337; 455/410; 713/168; 370/328

(58) Field of Classification Search ................ 455/337, 455/410; 375/340; 370/328, 395.52; 713/168, 713/191
See application file for complete search history.

(56) References Cited

U.S. PATENT DOCUMENTS

| 6,961,851 | B2 * | 11/2005 | Burritt et al. ................. 713/168 |
| 6,961,857 | B1 * | 11/2005 | Floryanzia ................... 713/168 |
| 7,366,110 | B2 * | 4/2008 | Gillespie et al. ............. 370/328 |
| 7,574,207 | B1 * | 8/2009 | O'Neil et al. ............. 455/412.2 |
| 7,742,463 | B2 * | 6/2010 | Lam et al. .................... 370/352 |

FOREIGN PATENT DOCUMENTS

JP      11-331911       11/1999

* cited by examiner

*Primary Examiner*—Quochien B Vuong
(74) *Attorney, Agent, or Firm*—Brundidge & Stanger, P.C.

(57) ABSTRACT

Security performance is improved by a software radio transceiver which can exchange software which is used for demodulation. A radio communication unit receives a radio signal. A conversion unit converts the radio signal received by the radio communication unit into digital data. The transceiver has a plurality of demodulating units which demodulate sub-data. A dividing unit divides the digital data converted by the conversion unit and distributes the sub-data to the plurality of demodulating units. A connection unit connects results obtained after the sub-data divided and distributed to the plurality of demodulating units by the dividing unit was demodulated by each of the demodulating units.

5 Claims, 7 Drawing Sheets

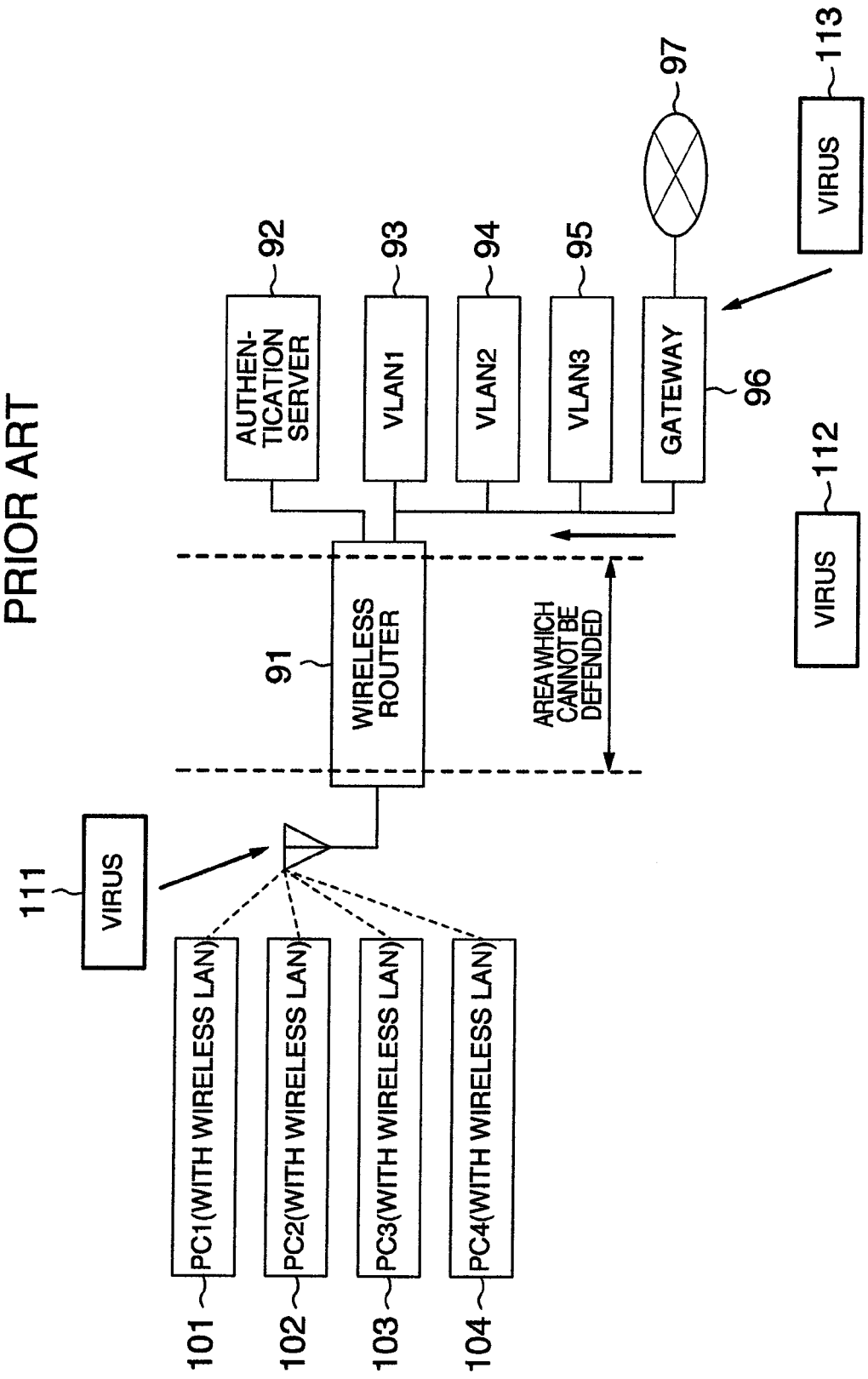

SOFTWARE RADIO TRANSCEIVER

INCORPORATION BY REFERENCE

The present application claims priority from Japanese application JP2007-031542 filed on Feb. 13, 2007, the content of which is hereby incorporated by reference into this application.

BACKGROUND OF THE INVENTION

1. Field of the Invention

The invention relates to a software radio transceiver and, more particularly, to a software radio transceiver whose security performance has been improved.

2. Description of the Related Art

In a software radio transceiver, software is changed, parameters are controlled, and a platform for making the software operative is used.

The platform has a role of separating a device and the software. As an example of the platforms, there is an operating system (OS) such as "Windows (registered trademark)". By using such an OS as a platform, for example, even if a CPU (Central Processing Unit) device is either "Pentium (registered trademark)" or "AMD", software such as "Word" or "Excel" can be used.

Figure 8:
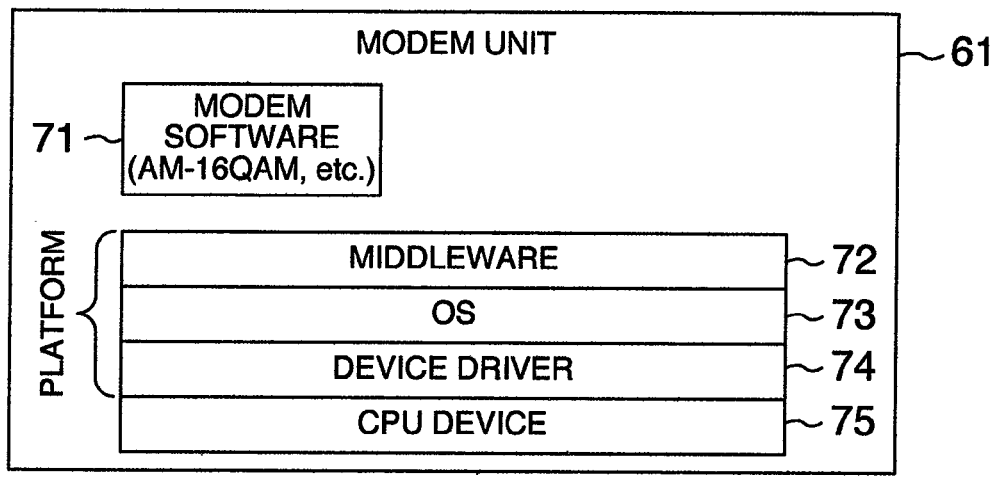

FIG. 8 shows an example of the platforms in the software radio transceiver.

Specifically speaking, modulation/demodulation software (hereinbelow, referred to as a MODEM software) 71 such as AM-16QAM or the like, middleware 72, an OS 73, a device driver 74, and a CPU device 75 are provided for a modulating/demodulating unit (hereinbelow, referred to as a MODEM unit) 61. The platform is constructed by the middleware 72, OS 73, and device driver 74.

By the platform, dependency between the MODEM software 71 and the device (CPU device 75) can be separated and the MODEM software 71 can be executed irrespective of a device type. As mentioned above, in the software radio transceiver, the platform is necessary to enable the software to be exchanged.

As a platform of the software radio transceiver, for example, the OS such as "Linux" or "vxWorks" is used.

In such an OS, a security has to be considered. In the security, the OS has to be defended from a destruction or intrusion (for example, Trojan horse, or the like) which can make a capture/alteration of system information.

In the software radio transceiver, from a role as a communication apparatus, an encryption is necessary in order to avoid a leakage of data of communication information. In recent years, owing to a spread of an idea of the information security, it is interpreted that the encryption is also included in the security.

In the software radio transceiver, therefore, it is necessary to realize the two types of securities as mentioned above.

Figure 9:
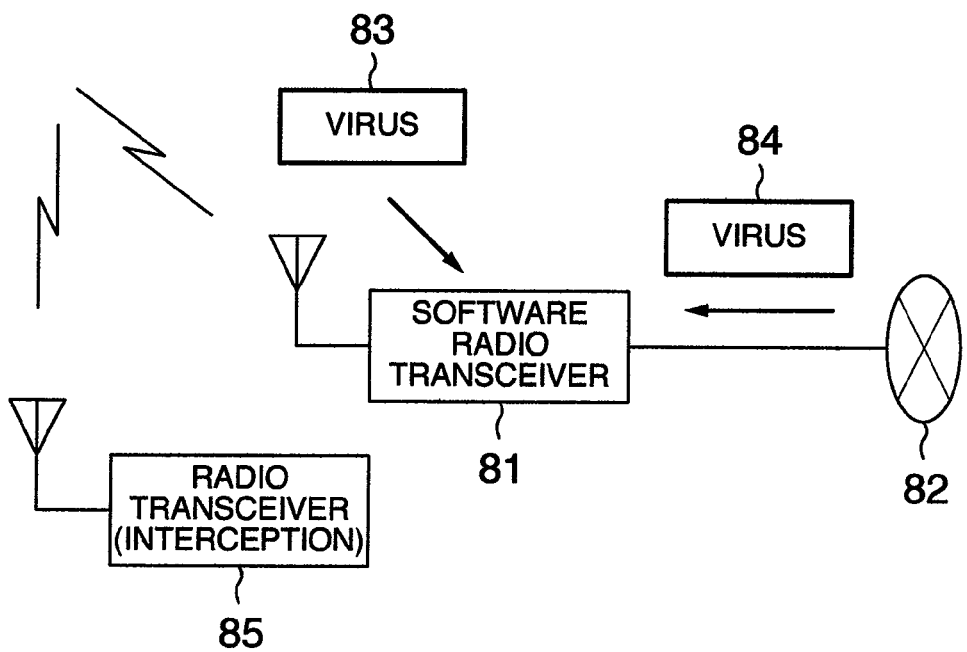

FIG. 9 shows an example of a threat to a software radio transceiver 81.

In the software radio transceiver 81, there are the following threats: an attacking/destroying action of a virus 83 which invades from a radio wave; an attacking/destroying action of a virus 84 which invades from a connected network 82; and a leakage of information due to a decipherment of a radio wave intercepted by another radio transceiver 85. A security against such threats is necessary.

The above related art has been disclosed in, for example, JP-A-11-331911.

SUMMARY OF THE INVENTION

In the software radio transceiver in the related art, only an encryption has been performed. As a method of preventing the intrusion from the outside, for example, the following system is considered: an authenticating action of the radio communication path is performed on the assumption that a communication in which an identifier (ID) has been allocated to the radio communication path is made, and after a result indicative of an authentication of the authenticating action is obtained, the radio communication path having such an ID is connected. Such a system is often used in a wireless LAN (Local Area Network).

However, according to such a system, an area which cannot be defended in the communication path certainly exists.

FIG. 10 shows an example of a construction of the system of the wireless LAN.

The system of the example has: a radio router 91; an authentication server 92; a plurality of VLANs (Virtual LANs) 93, 94, and 95; a gateway (GATEWAY) 96; a network 97; and a plurality of personal computers (PCs) 101, 102, 103, and 104 each having the function of the wireless LAN.

In the system of the example, the authentication server 92 defends an intrusion of a wireless LAN of a non-permitted PC. The gateway 96 defends an intrusion of a virus 113 from the network 97. The radio router 91 defends an intrusion of a virus 112 from the network 97. However, in the case where a virus 111 invades from the radio communication and attacks the radio router 91, there are no precautions and an area which cannot be defended exists.

Therefore, for example, assuming that the authenticating action is performed by the authentication server 92, an exchangeable function is necessary on the communication path from a point where a radio wave has been received to the authentication server 92. If a platform exists there, there is such a problem that the intrusion of the virus to the platform is indispensable.

As mentioned above, in the software radio transceiver in the related art, a further improvement is requested in terms of the security.

The invention is made in consideration of such circumstances in the related art as mentioned above and it is an object of the invention to provide a software radio transceiver which can raise the security performance.

To accomplish the above object, according to the invention, in a software radio transceiver which can exchange software that is used for demodulation, the following construction is used.

That is, a radio communication unit receives a radio signal. A conversion unit converts the radio signal received by the radio communication unit into digital data. The transceiver has a plurality of demodulating units which demodulate sub-data. A dividing unit divides the digital data converted by the conversion unit into the sub-data and distributes the sub-data to the plurality of demodulating units. A connection unit connects results obtained from which each of the demodulating units demodulates the sub-data distributed to the plurality of demodulating units by the dividing unit.

Therefore, the digital data obtained from the received radio signal is divided into the sub-data and the sub-data is distributed to the plurality of demodulating units and each demodulating unit demodulates the divided sub-data (sub-data obtained after the division). Consequently, for example, even in the case where data of a virus is included in the received radio signal, each demodulating unit processes the data obtained by dividing the data of the virus (segmented data), so that a function as a virus can be invalidated. By connecting the demodulation results (sub-data obtained after the demodulation) of the demodulating units, demodulation results of the original order can be obtained. Although there is a possibility that the demodulation results of the original order becomes the data of the virus, such virus data can be found out and exterminated by, for example, a processing unit provided at the post stage (for example, security unit 12 shown in FIG. 1).

In this manner, security performance in the software radio transceiver can be improved.

The number of plurality of demodulating units can be set to an arbitrary number. For example, the two demodulating units can be used or three or more demodulating units may be used.

As a construction of dividing the digital data into the sub-data and distributing them to the plurality of demodulating units, various constructions can be used. For example, a construction in which the digital data is divided into the sub-data at the same period and the sub-data is periodically distributed to each of the plurality of demodulating units can be also used.

As described above, according to the software radio transceiver of the invention, the digital data obtained from the received radio signal is divided into the sub-data and the sub-data is distributed to the plurality of different demodulating units and demodulated. Therefore, for example, even in the case where the virus is included in the received radio signal, the virus can be invalidated in the demodulating units and the security performance in the software radio transceiver can be improved.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing a constructional example of a software radio transceiver according to an embodiment of the invention;

FIG. 2 is a diagram showing an example of a platform of a MODEM unit;

FIG. 3 is a diagram showing an example of an attack of a virus to the platform of the MODEM unit;

FIG. 4 is a diagram showing a constructional example of the MODEM unit according to the embodiment of the invention;

FIG. 5 is a diagram showing an example of a flow of received code data;

FIG. 6 is a diagram showing an example of a demodulation and a connection of the code data;

FIG. 7 is a diagram showing an example of a protection of the platform according to segmentation of the virus;

FIG. 8 is a diagram for explaining necessity of a platform in software radio transceiver;

FIG. 9 is a diagram for explaining necessity of a security in the software radio transceiver; and FIG. 10 is a diagram for explaining vulnerability to the virus in a wireless LAN.

DETAILED DESCRIPTION OF THE EMBODIMENTS

An embodiment according to the invention will be explained with reference to the drawings.

FIG. 1 is a diagram showing a constructional example of a software radio transceiver 1 according to the embodiment of the invention.

The software radio transceiver 1 of the embodiment has a MODEM (modulating/demodulating) unit 11, a security unit 12, and an interface unit (I/F unit) 13.

The security unit 12 has, for example, an authentication server/client 21 and an encryptor 22 as a construction similar to that in the case of the wireless LAN.

In the software radio transceiver 1 of the embodiment, an audio signal inputted from a microphone is inputted to the MODEM unit 11 through the I/F unit 13 and the security unit 12, modulated by the MODEM unit 11, and transmitted from an antenna 41 in a wireless manner. A radio signal received by the antenna 41 is demodulated by the MODEM unit 11 and, thereafter, outputted as an audio sound from a speaker through the security unit 12 and the I/F unit 13.

The software radio transceiver 1 of the embodiment may be connected to, for example, an external network.

The intrusion of a virus from the network can be prevented by executing and making operative software for precautions against viruses (anti-virus software) on platforms of the I/F unit 13 and the security unit 12. For example, for the intrusion from the network, invasion protective wall software is executed on the platform of the I/F unit 13 and port scan monitoring can be executed. Even if a virus invaded, software which can instantaneously find out and exterminate the virus can be executed on the platform of the security unit 12.

However, if a virus invaded in a wireless manner, a type of code data cannot be discriminated until a radio wave is demodulated and the code data is obtained, so that the invasion protective wall (fire wall) cannot be used. That is, since the invasion protective wall is built in the software radio transceiver 1, there is no meaning of the security. In the MODEM unit 11, in many cases, since there is no room for execution of software which can instantaneously find out and exterminate the virus, if the code data is virus software, there are no measures for stopping the execution of the virus.

FIG. 2 shows an example of the platform of the MODEM unit 11.

Modulation/demodulation software (MODEM software) 31 such as AM-16QAM or the like, middleware 32, an operating system (OS) 33, and a CPU device 34 are provided for the MODEM unit 11 of the embodiment. In the embodiment, the platform is constructed by the middleware 32 and the OS 33. The MODEM software 31 can be exchanged by this platform.

However, as shown in FIG. 3, the MODEM software 31 and the platform are subjected to a danger by an attack/destroy of a virus 35.

In the software radio transceiver 1 of the embodiment, a construction to realize a security for defending an area of the MODEM unit 11 against a virus which invades in a wireless manner is provided as a construction to take a countermeasure against a threat of the virus to the MODEM unit 11.

FIG. 4 shows a constructional example of the MODEM unit 11 of the embodiment.

The MODEM unit 11 of the embodiment has: the antenna 41; a power amplifying unit 42; a frequency conversion unit 43; a conversion unit 44 having an A/D (Analog to Digital) converter and a D/A (Digital to Analog) converter; a clock generating unit 45; a switch unit 46; a first modulating/demodulating (MODEM) unit 47; a second modulating/demodulating (MODEM) unit 48; a code connection unit 49; and an encryption unit interface (I/F) unit 50.

A platform exists in each of the MODEM units 47 and 48. By downloading software of this platform through a predetermined interface, the software which is used for modulation/demodulation can be exchanged.

In the embodiment, the same software is downloaded into the two MODEM units 47 and 48 and used.

An example of the operation which is executed in the MODEM unit 11 of the embodiment is shown.

A receiving process will be described.

The radio signal received by the antenna 41 is amplified by the power amplifying unit (for example, low noise amplifier) 42, converted from a radio frequency (RF) into an intermediate frequency (IF) by the frequency conversion unit 43, and converted from an analog signal into digital code data by the A/D converter in the conversion unit 44.

The clock generating unit 45 generates a clock signal having a predetermined period and outputs to the switch unit 46 and the two MODEM units 47 and 48.

The switch unit 46 has a switch for switching a path by an interruption of the clock signal generated from the clock generating unit 45. In the embodiment, each time there is an interruption of the clock signal, the switch unit 46 switches a state of the path for outputting the code data from the conversion unit 44 to the first MODEM unit 47 and a state of the path for outputting the code data from the conversion unit 44 to the second MODEM unit 48. Thus, the code data from the conversion unit 44 is distributed to the first MODEM unit 47 and the second MODEM unit 48.

On the basis of the clock signal inputted from the clock generating unit 45, each of the MODEM units 47 and 48 demodulates the inputted code data and outputs its demodulation result (code data obtained after the demodulation) to the code connection unit 49 in response to the timing when the code data is inputted from the switch unit 46.

The code connection unit 49 connects the code data which is obtained after the demodulation and inputted from the two MODEM units 47 and 48 at the alternating timing so that the code data is arranged in the original order, and outputs its connection result (reception signal obtained after the demodulation) to the encryption unit I/F unit 50.

The encryption unit I/F unit 50 has a function for inputting and outputting analog and/or digital data from/to the outside (in the embodiment, security unit 12) and outputs the reception signal inputted from the code connection unit 49 to the outside (in the embodiment, security unit 12).

Figure 1:
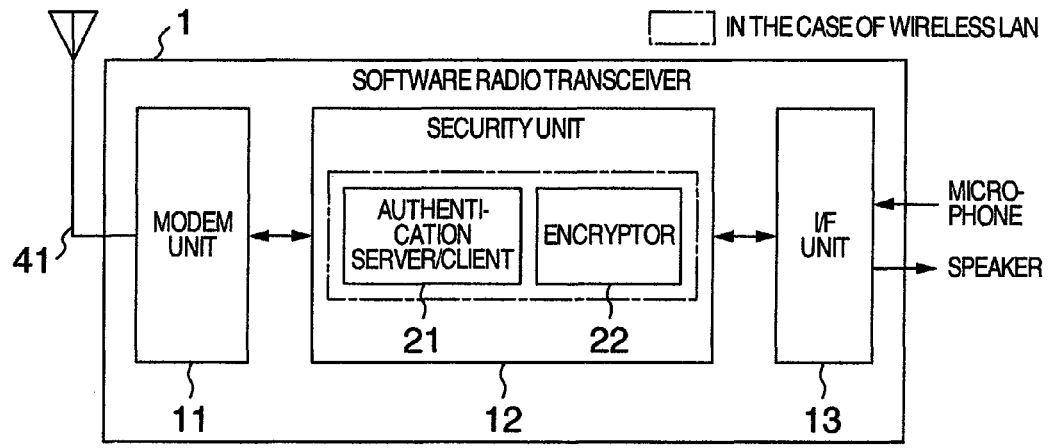
Figure 2:
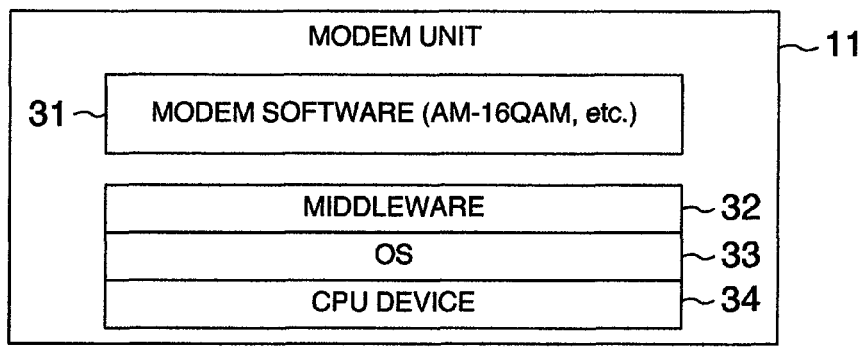
Figure 3:
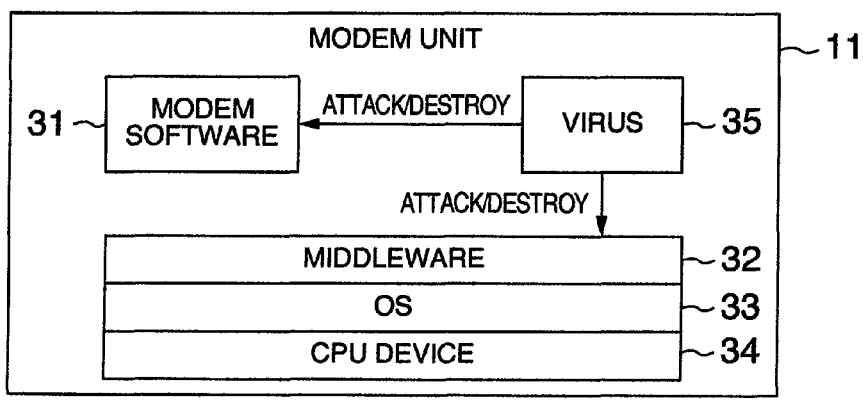
Figure 4:
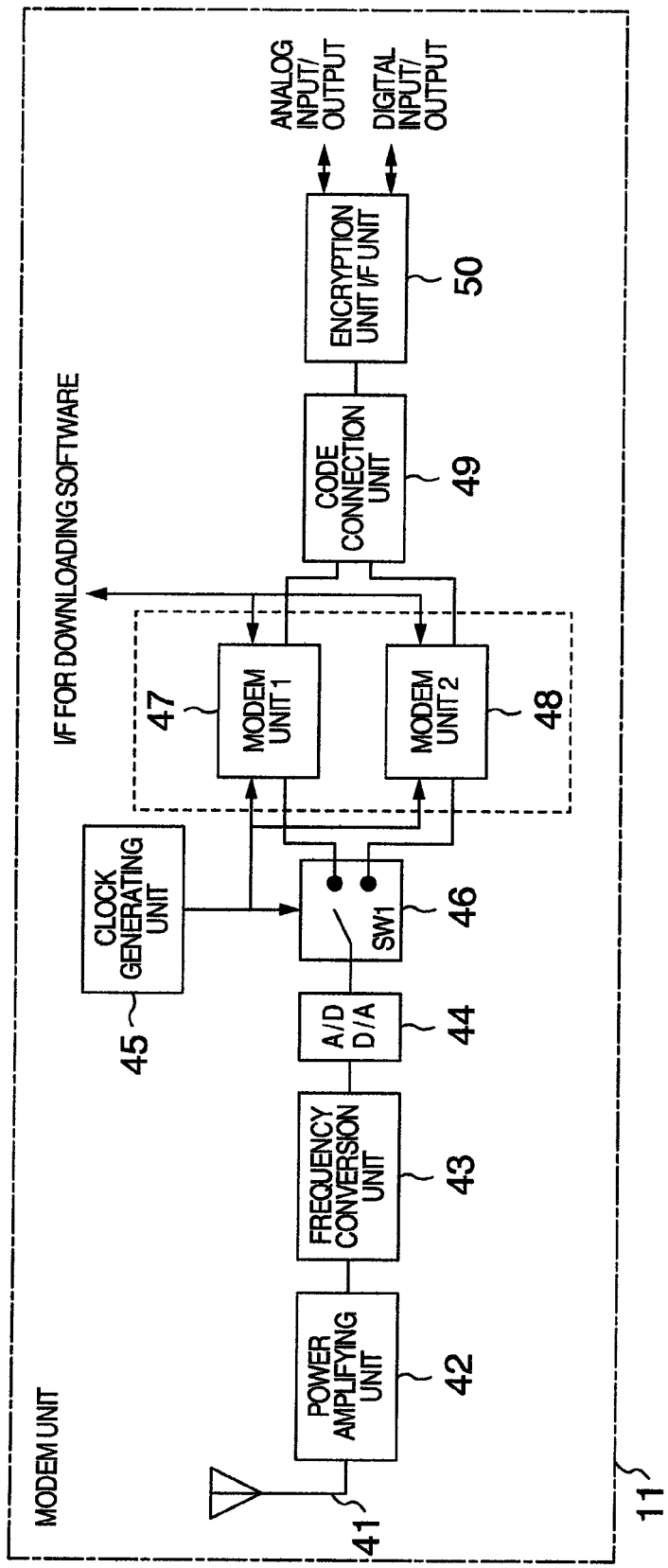
Figure 5:
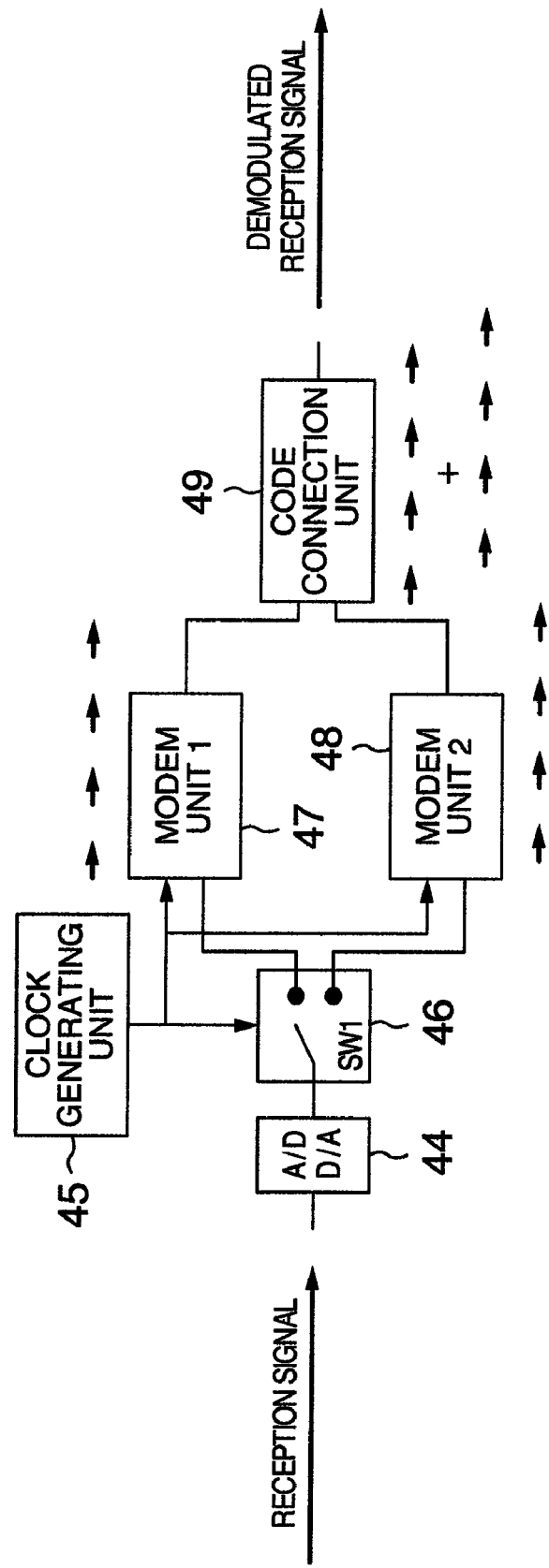

FIG. 5 shows an example of a state of a flow of the received code data with respect to the two MODEM units 47 and 48 and its peripheral processing units.

The code data which is inputted by switching the first MODEM unit 47 and the second MODEM unit 48, that is, the code data which is distributed to the first MODEM unit 47 and the second MODEM unit 48 is the data having the same length because the clock signals have the same period.

Each of the MODEM units 47 and 48 repeats the execution and stop (sleep) of the demodulating process synchronously with the clock period by the interruption of the clock signal from the clock generating unit 45. That is, while the code data is being inputted, each of the MODEM units 47 and 48 executes the demodulation. When no code data is inputted (for a period of time from the completion of a certain demodulating process to the start of the next demodulating process), each of the MODEM units 47 and 48 stops the demodulation.

The code connection unit 49 connects the code data demodulated by the two MODEM units 47 and 48 and returns them to one reception signal.

Figure 6:
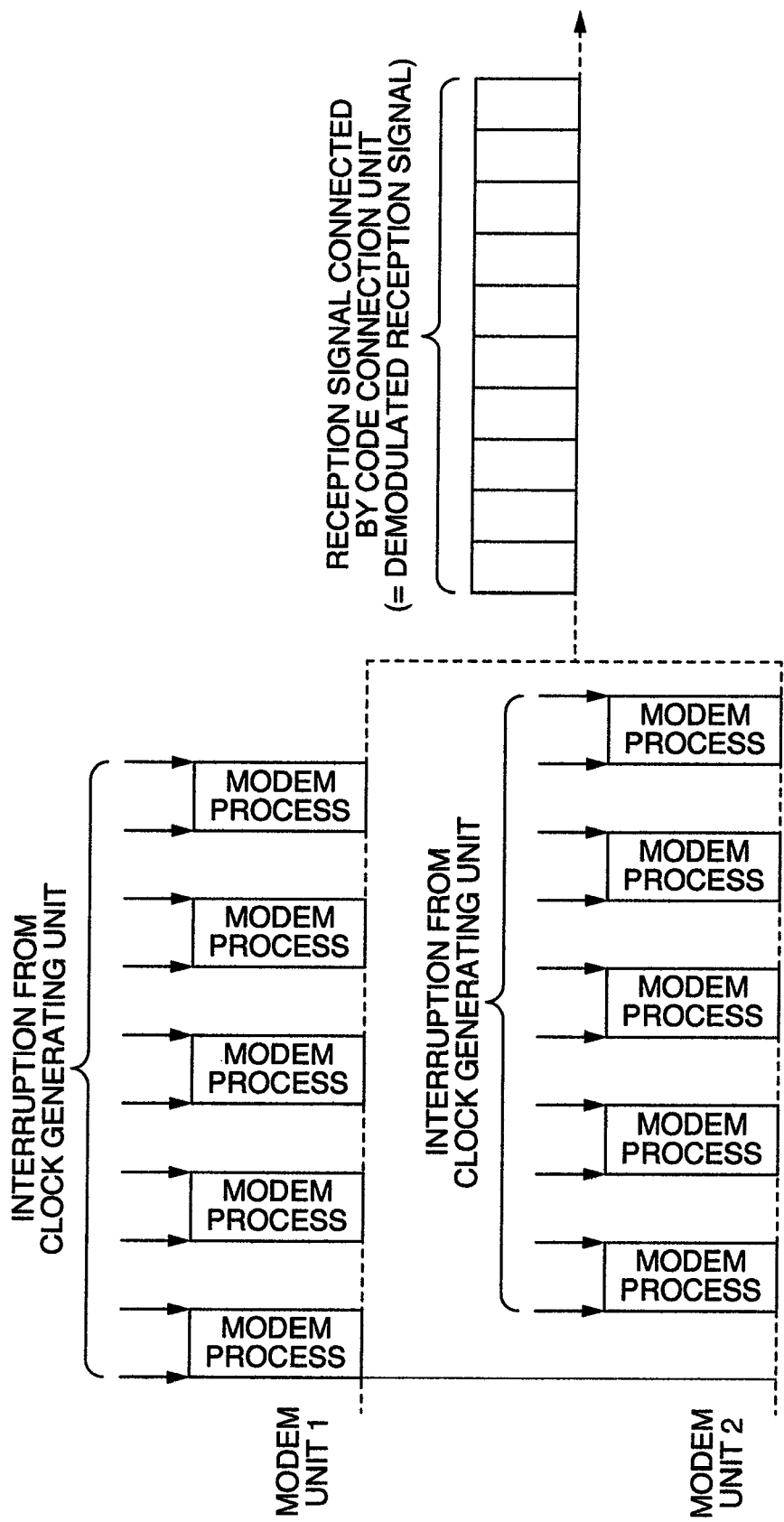

FIG. 6 shows an example of the states of the demodulation and the connection of the code data.

In the two MODEM units 47 and 48, the timing when the demodulating process is executed and the timing when the demodulating process is stopped are opposite, so that the demodulation is alternately executed.

In the code connection unit 49, the demodulated code data which is inputted from the two MODEM units 47 and 48 at the alternate timing is connected to one data.

Figure 7:
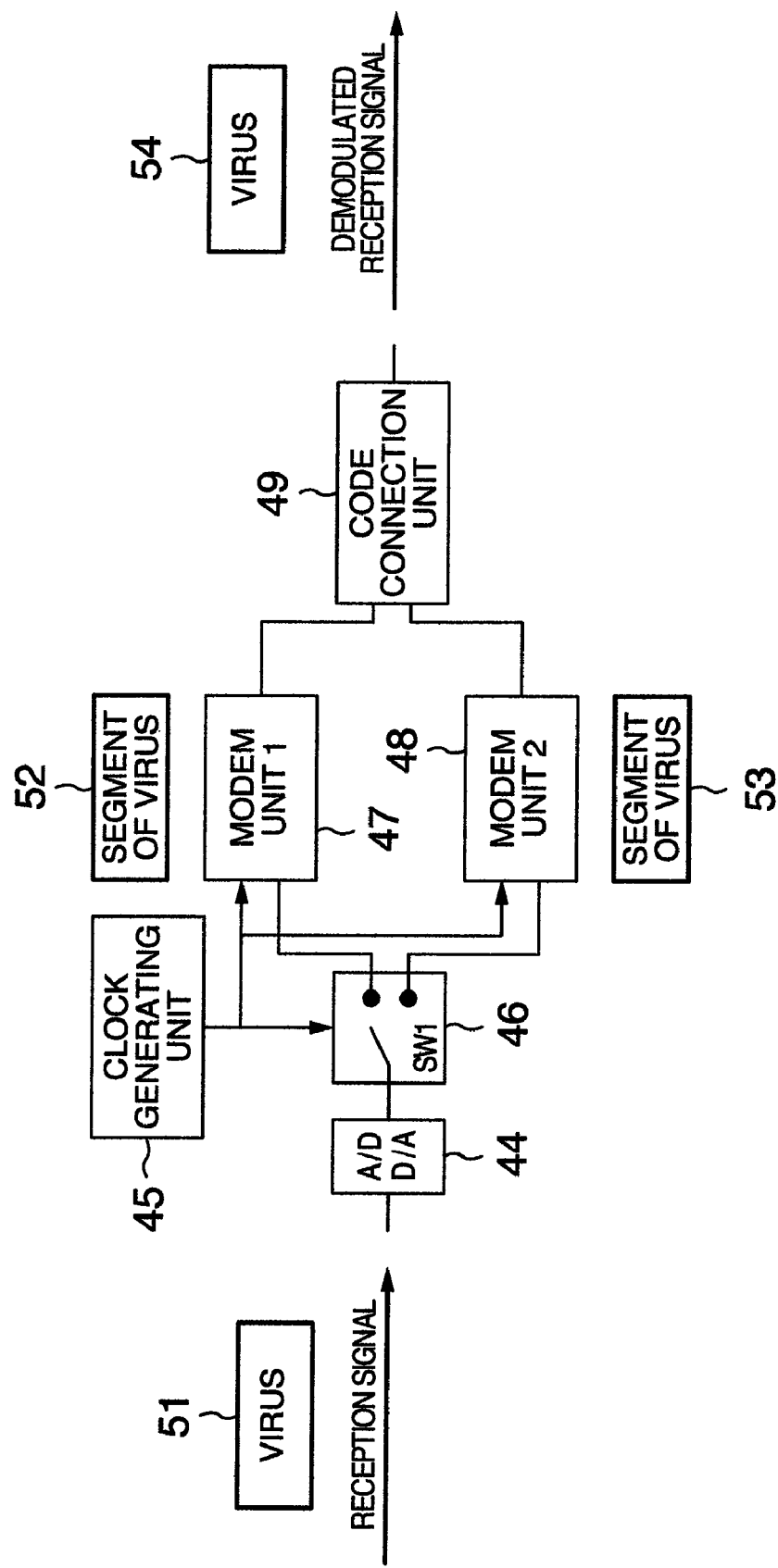

FIG. 7 shows an example of a state of protection of the platforms which is realized by segmentation of a virus with respect to the two MODEM units 47 and 48 and its peripheral processing units.

Even in the case where software of a virus 51 which invades in a wireless manner is included in the reception signal, code data obtained from this reception signal is divided into two sub-data, and the two sub-data are inputted to each of the MODEM units 47 and 48. Therefore, in the code data inputted to each of the MODEM units 47 and 48, sub-data (segments of the virus) 52 and 53 obtained by segmenting the code data of the virus 51 are subjected to the demodulating process. Thus, the code data of the virus cannot operate as a virus on the platforms. In the code data connected by the code connection unit 49 (demodulated reception signal), software of a virus 54 (corresponding to the foregoing virus 51) revives. However, since it is exterminated by the security unit 12 provided just after the MODEM unit 11, the security is assured.

As mentioned above, in the platforms existing in the MODEM units 47 and 48, since the segment sub-data of the virus is handled, the segment cannot show a function as a virus and the platforms can be protected against the attack/destroy that is performed by the virus. There is a possibility that the data connected by the code connection unit 49 is data of the virus. However, since the code connection unit 49 and the encryption unit I/F unit 50 are hardware having no platform, the virus is not executed but sent to the security unit 12 and exterminated there. Consequently, the platform of the MODEM unit 11 of the software radio transceiver 1 which is threatened with the virus can be protected.

A transmitting process will now be described.

Data inputted from the outside (in the embodiment, security unit 12) through the encryption unit I/F unit 50 is inputted to the MODEM units 47 and 48 through the code connection unit 49, modulated by the MODEM units 47 and 48, and inputted to the conversion unit 44 through the switch unit 46. The data inputted to the conversion unit 44 is converted from the digital signal into the analog signal by the D/A converter in the conversion unit 44, converted from the intermediate frequency (IF) into the radio frequency (RF) by the frequency conversion unit 43, amplified by the power amplifying unit 42, and transmitted from the antenna 41 in a wireless manner.

In the transmitting process, it is not always necessary to use both of the two MODEM units 47 and 48. For instance, it is also possible to construct in such a manner that no processes are executed in particular in the code connection unit 49, the switch of the switch unit 46 is connected to one of the two MODEM units 47 and 48, and the modulation is executed by using only the connected MODEM unit.

In the transmitting process, the two MODEM units 47 and 48 can be also alternately used in a manner similar to that in the receiving process. For example, it is also possible to construct in such a manner that the data from the encryption unit I/F unit 50 is divided into two sub-data by the code connection unit 49, the two sub-data are alternately inputted to the two MODEM units 47 and 48, the switch is switched so that the switch unit 46 is alternately connected to the paths of the two MODEM units 47 and 48, and the data of the original order (data obtained after the modulation) is inputted to the conversion unit 44.

As another constructional example, the processing unit for executing the transmitting process and the processing unit for executing the receiving process can be also provided as individual processing units with respect to all or a part of them.

As mentioned above, in the software radio transceiver 1 of the embodiment, a binary code of the virus is segmented in the MODEM unit 11 against the virus which invades in a wireless manner, so that the function of the virus can be invalidated and an intrusion by an external hacker/cracker or the like can be prevented.

Therefore, in the software radio transceiver 1 of the embodiment, the software radio transceiver can be protected from the virus, a defense method which can cope with any type of virus is not limited can be provided, and a defense method which can be applied to the general software radio communication can be provided. According to the construction of the embodiment, for example, although there is a possibility that the hardware enlarges (as compared with the case of using only one MODEM unit), since there is no need to form the software for precautions against viruses, labor costs and the like can be consequently reduced.

In the software radio transceiver 1 of the embodiment, a radio communication unit is constructed by the function of receiving the radio signal by the antenna 41, power amplifying unit 42, and frequency conversion unit 43, a conversion unit is constructed by the function of converting the reception signal into the digital data by the A/D converter in the conversion unit 44, a plurality of demodulating units are constructed by the demodulating functions of the plurality of MODEM units 47 and 48, a dividing unit is constructed by the function of dividing the digital data by the clock generating unit 45 and the switch unit 46 and distributing the sub-data to the plurality of demodulating units 47 and 48, and a connection unit is constructed by the function of connecting the demodulation results obtained from the plurality of demodulating units 47 and 48 by the code connection unit 49.

The constructions of the system, apparatus, and the like according to the invention are not always limited to those mentioned above but various constructions can be used. The invention can be also provided, for example, as a method or system for executing the processes according to the invention, a program for realizing such a method or system, a recording medium for recording such a program, or the like. The invention can be also provided as various systems or apparatuses.

Fields of application of the invention are not always limited to those mentioned above but the invention can be also applied to other various fields. For example, the construction shown in the above embodiment can be applied to not only the software radio transceiver but also a general radio transceiver.

As various processes which are executed in the system, apparatus, and the like according to the invention, a construction in which the system, apparatus, and the like are controlled by a method whereby a processor executes a control program stored in a ROM (Read Only Memory) in a hardware resource having the processor, a memory, and the like can be used. For example, each of the function units for executing the processes can be also constructed as an independent hardware circuit.

The invention can be also grasped as a computer-readable recording medium such as floppy (registered trademark) disk, CD (Compact Disc)-ROM, or the like in which the foregoing control program has been stored or as such a program (itself). The processes according to the invention can be also executed by a method whereby the control program is inputted from the recording medium to the computer and executed by the processor.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A software radio transceiver configured to permit a change in software according to a desired demodulation, comprising:
   a radio communication unit which receives a radio signal;
   a conversion unit which converts the radio signal received by the radio communication unit into digital data;
   a plurality of demodulating units which demodulate sub-data,
   wherein each of said demodulating units is implemented by software having a configuration that can be changed according to the desired demodulation;
   a dividing unit which divides the digital data converted by the conversion unit into a plurality of sub-data and distributes each of the plurality of sub-data to one of the demodulating units; and
   a connection unit, coupled to the demodulating units, which combines each of the demodulated sub-data from the demodulating units with each other and outputs the combined demodulated sub-data from the demodulating units as a demodulated radio signal.

2. A software radio transceiver according to claim 1, wherein execution of a code of a virus is prevented by the dividing of the digital data converted by the conversion unit into the plurality of sub-data, thereby dividing the code of the virus among the plurality of sub-data, and the distributing of each of the plurality of sub-data to one of the demodulating units.

3. A software radio transceiver according to claim 1, wherein said dividing unit comprises:
   a switch, coupled to said connection unit, which receives the converted digital data from the conversion unit and switches the converted digital data to be output to one of the demodulating units based on a clock signal; and
   a clock generator, coupled to the switch, which outputs said clock signal.

4. A software radio transceiver according to claim 1, further comprising:
   a security part, coupled to said conversion unit, which receives the demodulated radio signal from the connection unit and prevents use of the demodulated radio signal if the demodulated radio signal contains un-authorized code.

5. A software radio transceiver according to claim 4, wherein said un-authorized code is a virus.

* * * * *